United States Patent [19]
Petropoulos et al.

[11] Patent Number: 5,636,887
[45] Date of Patent: Jun. 10, 1997

[54] APPARATUS FOR LIFTING OBJECTS BY SUCTION AND RELEASING THEM BY GAS PRESSURE

[75] Inventors: Steven N. Petropoulos, Chesterfield; Richard W. Martin, Mt. Clemens; Edward J. Sands, Troy, all of Mich.

[73] Assignee: Chrysler Corporation, Auburn Hills, Mich.

[21] Appl. No.: 406,616

[22] Filed: Mar. 20, 1995

[51] Int. Cl.$^6$ ................ B25J 15/06; B66C 1/02
[52] U.S. Cl. .............. 294/64.2; 285/137.1; 285/305; 294/64.1
[58] Field of Search ................. 294/64.1–64.3, 294/65; 271/90, 97; 285/137.1, 305, 308; 901/40

[56] References Cited

U.S. PATENT DOCUMENTS

| | | | |
|---|---|---|---|
| 2,772,898 | 12/1956 | Seeler | 285/305 X |
| 3,428,340 | 2/1969 | Pelton | 285/308 X |
| 3,466,079 | 9/1969 | Mammel | 294/64.3 |
| 3,517,958 | 6/1970 | Boucher et al. | 294/64.1 |
| 3,560,027 | 2/1971 | Graham | 285/305 X |
| 3,863,568 | 2/1975 | Frederick | 102/13 |
| 4,648,786 | 3/1987 | Sakurai | 414/752 |
| 4,651,396 | 3/1987 | Kerlidou | 294/64.1 X |
| 4,815,913 | 3/1989 | Hata et al. | 414/225 |
| 4,831,721 | 5/1989 | Hirai et al. | 29/740 |
| 4,840,416 | 6/1989 | Jacobson | 294/2 |
| 5,064,234 | 11/1991 | Marozsan et al. | 294/64.1 |

FOREIGN PATENT DOCUMENTS

| | | | |
|---|---|---|---|
| 163735 | 3/1963 | U.S.S.R. | 294/64.1 |
| 1558844 | 11/1981 | U.S.S.R. | 294/64.1 |
| 1105438 | 5/1983 | U.S.S.R. | 294/64.1 |
| 1771959 | 10/1992 | U.S.S.R. | 294/64.1 |
| 1165382 | 8/1966 | United Kingdom | 294/65 |

*Primary Examiner*—Johnny D. Cherry
*Attorney, Agent, or Firm*—Margaret A. Dobrowitsky

[57] ABSTRACT

An apparatus includes a lifting device having a gas-attachment end and a lifting end, two pins each attachable to the gas-attachment end of the lifting device, and a gas-supply coupler for connecting a gas supply to the lifting device. Each pin has a longitudinal bore extending therethrough and an extending portion which extends beyond the gas-attachment end of the lifting device when the pins are attached thereto. One of the pins has an exterior annular notch on the extending portion. The gas-supply coupler is connectable to the two pins and has a locking element which releasably locks into the annular notch on the pin having the annular notch. The lifting device, the two pins, and the gas-supply coupler together have two passages leading from the gas-supply coupler, through the longitudinal bores of the two pins and to the lifting end of the lifting device. One passage is designed such that, when gas flows therethrough toward the lifting end, suction is created at the lifting end. The other passage is designed such that, when gas flows therethrough toward the lifting end, gas is expelled at the lifting end.

12 Claims, 3 Drawing Sheets

APPARATUS FOR LIFTING OBJECTS BY SUCTION AND RELEASING THEM BY GAS PRESSURE

BACKGROUND OF THE INVENTION

1. Field of the Invention

The present invention relates generally to connectors and apparatuses for lifting objects and, more particularly, to connectors for gas supplies and apparatuses for pneumatically lifting objects using such connectors.

2. Description of the Related Art

Manipulation of parts being made in an assembly process is commonly achieved using automated pneumatic devices. For example, in the automotive industry, parts being produced, such as fenders or hoods which are being drawn, pressed, formed, or punched, are moved from station to station on an assembly line by an automated pneumatic lifting apparatus.

The apparatus commonly includes a vacuum cup with a lifting surface for lifting the parts. In the vacuum cup, vacuum can be created by routing pressurized air in one direction, thus, enabling a part to be lifted by suction. If pressurized air is routed another direction, air is expelled toward the lifting surface of the vacuum cup, thereby releasing any attached part.

Connectors for connecting the pressurized air supply to the lifting apparatus are required. The connectors are commonly releasably locked in place with a locking mechanism so that they can be easily connected and disconnected.

In the past, some connectors have been designed in a way that they had to be machined after they were assembled with the lifting apparatus. In addition, some connectors were designed so that they frequently did not line up with the locking mechanism, resulting in breakage of the connector and/or the locking mechanism.

It is, therefore, one object of the present invention to provide an improved connector for connecting a gas supply to a pneumatic lifting device.

It is another object of the present invention to provide an improved connector for use in a pneumatic lifting apparatus for connecting a gas supply to a lifting device which connector may be fully formed before assembly with the lifting apparatus.

It is yet another object of the present invention to provide an improved connector for use in a pneumatic lifting apparatus equipped with a locking mechanism in which the connector is easily aligned with the locking mechanism.

It is still another object of the present invention to provide an apparatus for pneumatically lifting objects which uses the improved connector of the present invention.

SUMMARY OF THE INVENTION

To achieve the foregoing objects, one embodiment of the present invention is a connector for connecting a gas supply to a pneumatic lifting device. The connector includes a pin having a first end, a second end, a screw-threaded region near the second end, a longitudinal bore extending from the first end to the second end, and an annular notch on the exterior thereof.

Preferably, the pin further includes a non-threaded exterior region near the first end and a shoulder between the annular notch and the second end and the screw-threaded region has a smaller diameter than the outer diameter of the shoulder. In addition, the longitudinal bore may be hexagonal at the first end and the pin may further have a smooth exterior region between the screw-threaded region and the shoulder, the smooth exterior region having a smaller diameter than the outer diameter of the shoulder.

Another embodiment of the present invention is an apparatus for lifting objects by suction and releasing them by gas pressure. The apparatus includes a lifting device, first and second pins, and a gas-supply coupler for connecting a gas supply to the lifting device.

The lifting device has a gas-attachment end and a lifting end. The first and second pins each have a longitudinal bore extending therethrough and are attachable to the gas-attachment end of the lifting device. The first and second pins also each have an extending portion which extends beyond the gas-attachment end when the pins are attached thereto. The first pin has an exterior annular notch on the extending portion. The gas-supply coupler is connectable to the first and second pins and has locking means which releasably locks into the annular notch on the first pin.

The locking device, the first and second pins, and the gas-supply coupler together have first and second internal passages leading from the gas-supply coupler, through the longitudinal bores of the first and second pins, respectively, to the lifting end of the lifting device. The first passage is designed such that, when gas flows therethrough toward the lifting end, suction is created at the lifting end. The second passage is designed such that, when gas flows therethrough toward the lifting end, gas is expelled at the lifting end.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

Figures 1, 2:
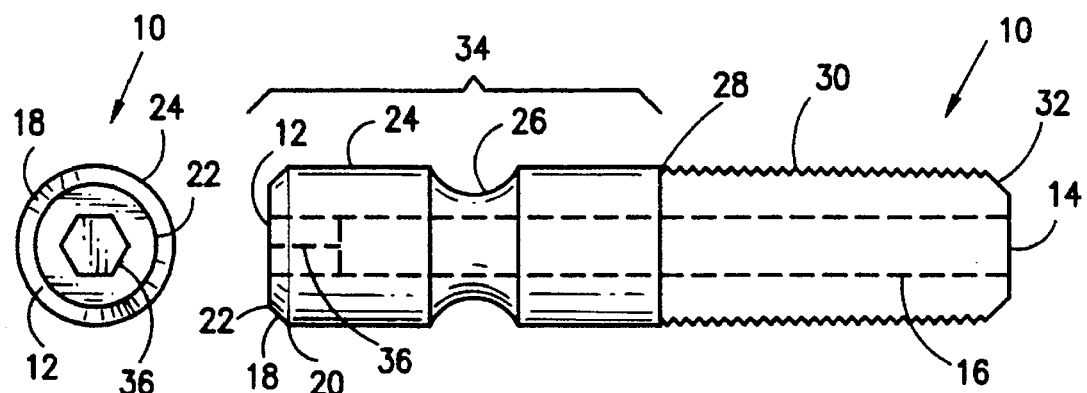
FIG. 1 is a side elevational view of a connector according to the present invention.
FIG. 2 is an end view of the connector of FIG. 1.

Referring first to FIG. 1, a connector for connecting a gas supply to a pneumatic lifting device includes a notched pin which is generally indicated by reference numeral 10. Notched pin 10 has first end 12, second end 14, and longitudinal bore 16 extending from first end 12 to second end 14.

In longitudinal sequence from first end 12, notched pin 10 has first bevelled surface 18 having outer circumference 20 and inner circumference 22, non-threaded exterior region 24 near first end 12, exterior annular notch 26, shoulder 28, screw-threaded region 30 near second end 14, second bevelled surface 32, and second end 14. Screw-threaded region 30 has a smaller diameter than the outer diameter of shoulder 28. The portion of notched pin 10 which extends from first end 12 to shoulder 28 is considered to be extending portion 34. In addition, longitudinal bore 16 of notched pin 10 has hexagonal broach 36 at first end 12. The circumference of non-threaded exterior region 24 is the same as outer circumference 20 of first bevelled surface 18 and the outer diameter of shoulder 28.

FIG. 2 shows an end view of first end 12 of notched pin 10 in which non-threaded exterior region 24, inner circumference 22 of first bevelled surface 18, and hexagonal broach 36 can be seen.

Figure 3:
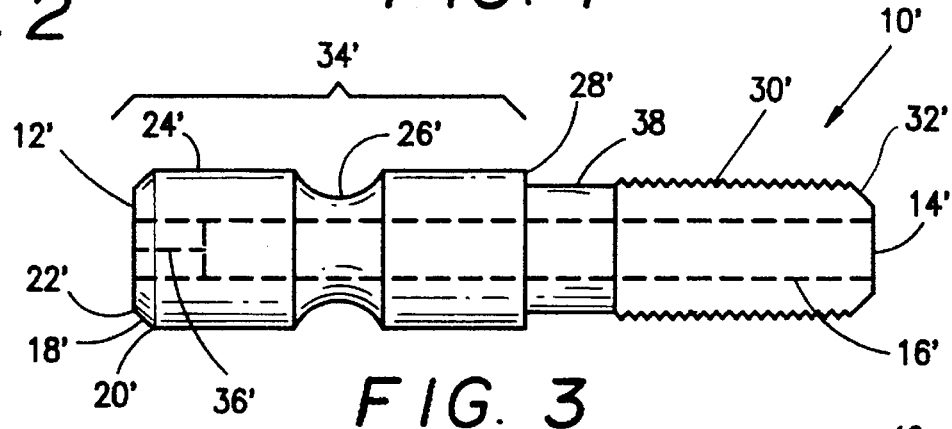
FIG. 3 is a side elevational view of another connector according to the present invention.

FIG. 3 illustrates an alternative structure for the connector of the present invention which is a notched pin generally designated by reference numeral 10'. Features on notched pin 10' that are similar to those on notched pin 10 are designated by the same numeral prefix but end with a "'" suffix. The only difference between notched pin 10 and notched pin 10' is that notched pin 10' has smooth exterior region 38 between its shoulder 28' and its screw-threaded region 30'. Smooth exterior region 38 has a smaller diameter than the outer diameter of shoulder 28', and, preferably has a diameter substantially equal to the inside of the threads on screw-threaded region 30'.

Figure 4:
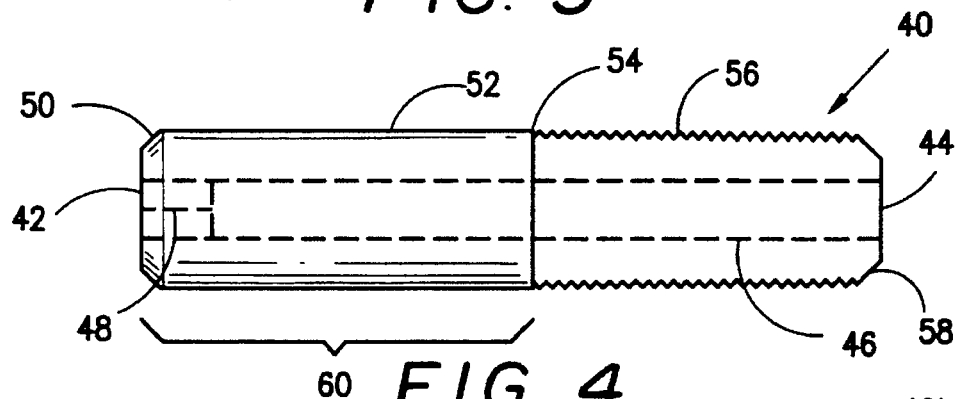
FIG. 4 is a side elevational view of a complimentary connector to be used in conjunction with a connector of the present invention.
Figure 5:
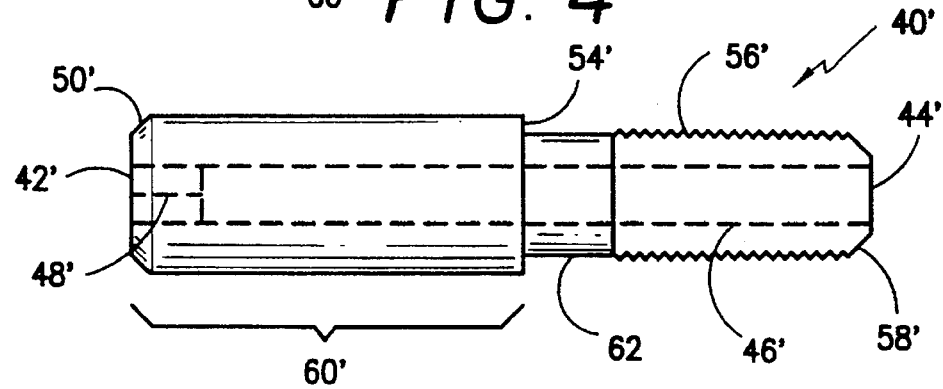
FIG. 5 is a side elevational view of another complimentary connector to be used in conjunction with a connector of the present invention.

FIGS. 4 and 5 show complimentary unnotched pins 40 and 40' which are typically paired with a notched pin during use. Unnotched pin 40 basically has first end 42, second end 44, longitudinal bore 46 extending from first end 42 to second end 44, hexagonal broach 48 in longitudinal bore 46 at first end 42, first bevelled surface 50, non-threaded exterior region 52, shoulder 54, screw-threaded region 56, and second bevelled surface 58. The portion of unnotched pin 40 from first end 42 to shoulder 54 is considered to be extending portion 60.

Features on notched pin 40' that are similar to those on notched pin 40 are designated by the same numeral prefix but end with a "'" suffix. The only difference between unnotched pin 40 and unnotched pin 40' is that unnotched pin 40' has smooth exterior region 62 between its shoulder 54' and its screw-threaded region 56'. Smooth exterior region 62 has a smaller diameter than the outer diameter of shoulder 54', and, preferably has a diameter substantially equal to the inside of the threads on screw-threaded region 56'.

Figure 6:
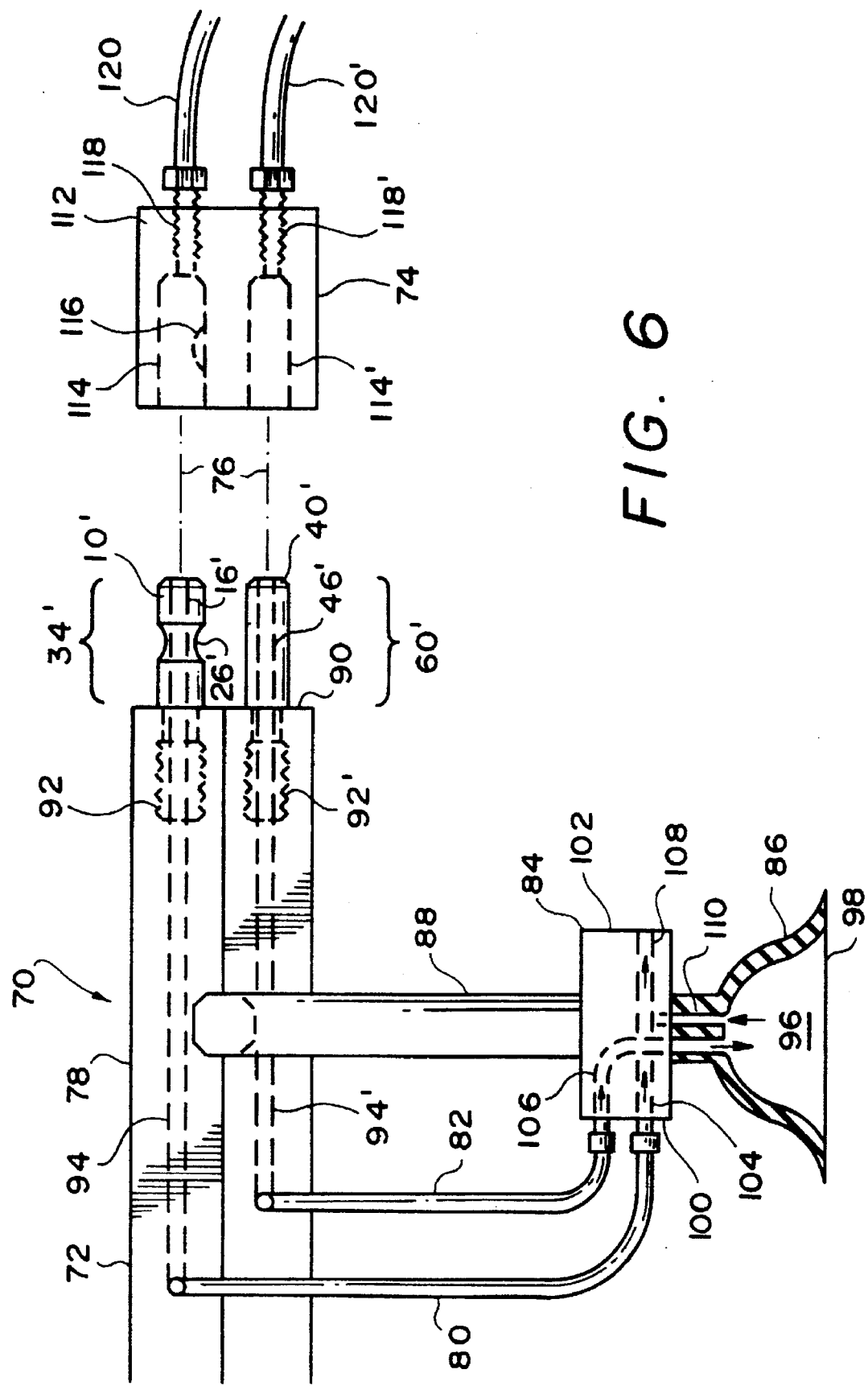
FIG. 6 is a side elevational view of an apparatus for lifting objects, the apparatus being in accordance with the present invention.

FIG. 6 shows the intended use of the connectors of the present invention in apparatus 70 of the present invention which is used for lifting objects by suction and releasing them by gas pressure. Apparatus 70 includes pneumatic lifting device 72 and gas-supply coupler 74 which is connectable to a compressed gas supply (not shown). Lifting device 72 and gas-supply coupler 74 are connectable by pins 10' and 40'. Dot-dash lines 76 show where pins 10' and 40' should connect to gas-supply coupler 74. Generally, apparatus 70 operates to lift objects when compressed gas flows through one set of channels and releases the lifted objects when gas flows through another set of channels.

Lifting device 72 generally includes boom arm 78, hoses 80 and 82 attached to boom arm 78, gas-directing block 84 attached to hoses 80 and 82, vacuum cup 86 attached to gas-directing block 84, and support beam 88 attaching gas-directing block 84 to boom arm 78.

Boom arm 78 has gas-attachment end 90 with screw-threaded bores 92 and 92' therein, which bores are matingly-sized to fit pins 10' and 40', respectively, therein. Boom arm 78 also has elongated cavities 94 and 94' which lead from bores 92 and 92', respectively. Pins 10' and 40' are shown connected to lifting device 72 such that longitudinal bores 16' and 46' of pins 10' and 40' are in fluid communication with elongated cavities 94 and 94', respectively. Hoses 80 and 82 are attached to boom arm 78 so that the interior of hoses 80 and 82 are in fluid communication with elongated cavities 94 and 94', respectively.

Vacuum cup 86 and gas-directing block 84 constitute the lifting end of lifting device 72. Vacuum cup 86, shown in cross-section, is generally an inverted cup formed of flexible material, such as rubber, and has concave opening 96 and lifting surface 98.

Gas-directing block 84 has entrance end 100, exit end 102, and internal pathways 104 and 106 and is attached to hoses 80 and 82 so that the interiors of hoses 80 and 82 are in fluid communication with internal pathways 104 and 106, respectively.

Internal pathway 104 has main canal 108 which leads from entrance end 100 to exit end 102 of gas-directing block 84 and hole 110 leading from main canal 108 to concave opening 96. Internal pathway 106 leads from entrance end 100 of gas-directing block 84 to concave opening 96 of vacuum cup 86.

Gas-supply coupler 74 includes block 112 which has bores 114 and 114' for accepting extending portions 34' and 60' of pins 10' and 40', respectively, releasable locking mechanism 116 (partially shown) for locking into annular notch 26' of pin 10', and has threaded bores 118 and 118' for connection to gas supply lines 120 and 120'.

Figure 7:
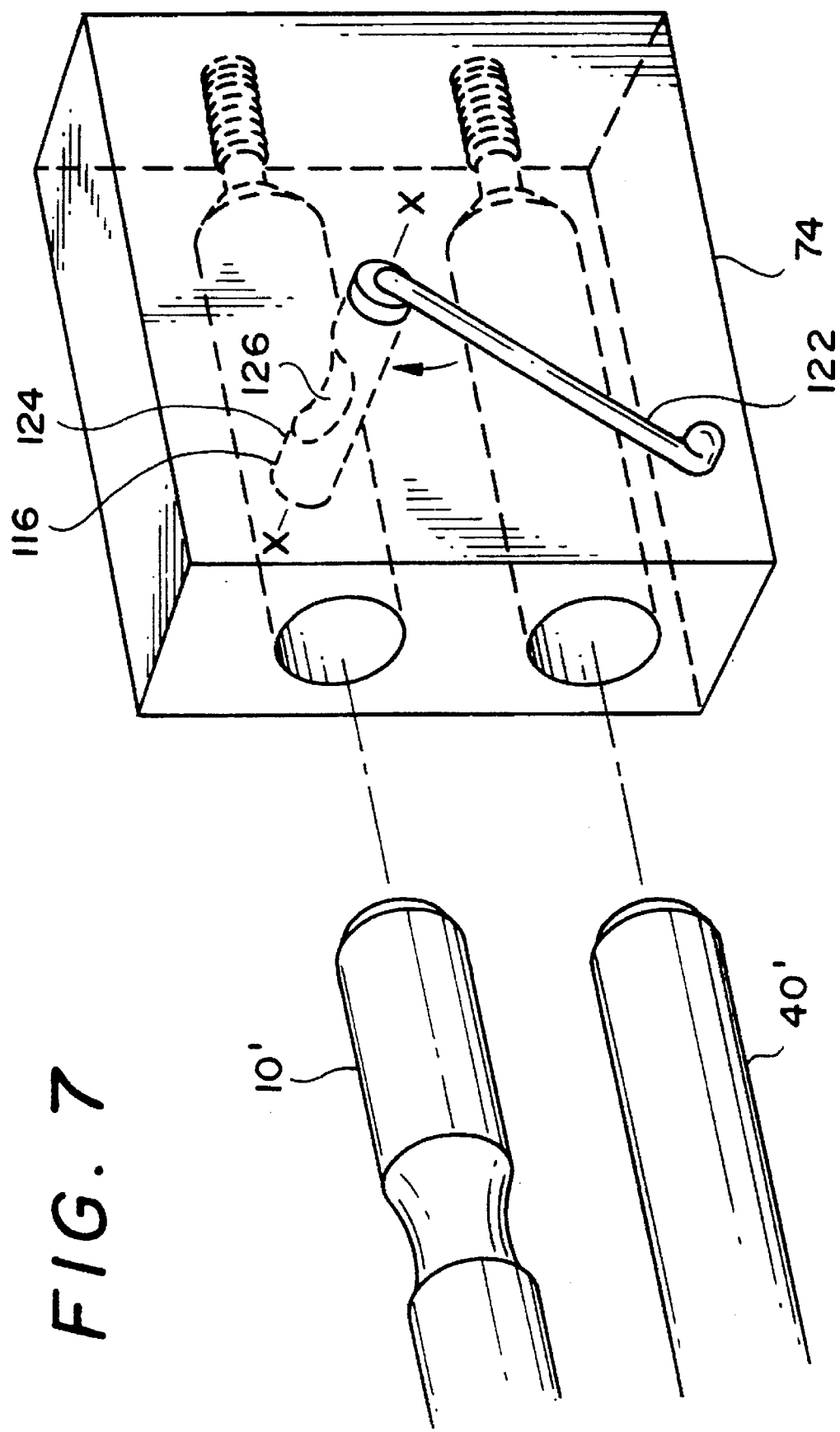
FIG. 7 is an exploded perspective view of a connector of the present invention shown with a gas-supply equipped with a locking mechanism.

FIG. 7 shows, more completely, gas-supply coupler 74 in exploded perspective view with pins 10' and 40'. Releasable locking mechanism 116 includes rotatable handle 122 and rotatable cylinder 124 having slot 126 therein. Rotatable cylinder 124 is rotatable around its longitudinal axis (X—X) and is inserted through block 112 and is positioned so that its longitudinal axis (x—x) is perpendicular to the longitudinal axes of pins 10' and 40'. Rotatable handle 122 is also rotatable around the x—x axis.

To connect gas-supply coupler 74 to lifting device 72, pin 10' is screwed into threaded bore 92 in boom arm 78. Second bevelled surface 32' on pin 10' (see FIG. 3) makes for easier insertion of pin 10' into threaded bore 92. Pin 10' may be tightened into threaded bore 92 by inserting an appropriately-sized Allen wrench into hexagonal broach 36' in pin 10'. Pin 40' may then be screwed into threaded bore 92' in boom arm 78 and tightened with an Allen wrench. Pins 10' and 40' are typically tightened until shoulders 28' and 54' abut against end 90 of boom arm 78, thus leaving extending portions 34' and 60' extending beyond end 90.

Pins 10' and 40' may be inserted in the reverse order. Alternative to using an Allen wrench/hexagonal broach for tightening the pins, the pins may include some flat surfaces near the first end of the pins and the pins may then be tightened with a conventional wrench. In addition, pin 10 may be used in place of pin 10', and/or pin 40 may be used in place of pin 40'.

Next, gas-supply coupler 74 is connected to pins 10' and 40' simply by inserting pins 10' and 40' into bores 114 and 114', respectively, in gas-supply coupler 74. When inserting pins 10' and 40' into bores 114 and 114', rotatable cylinder 124 of locking mechanism 116 is rotated so that slot 126 is aligned with bore 114 to allow pin 10' to pass through bore 114. Once pins 10' and 40' are fully inserted into bores 114 and 114', respectively, rotatable cylinder 124 is rotated by rotating handle 122 so that a portion of rotatable cylinder 124 locks into annular notch 26' in pin 10'.

Pin 10' advantageously has annular notch 26' rather than a radially-finite notch therein. Annular notch 26' allows the insertion of pin 10' some tolerance while still allowing for rotatable cylinder 124 to lock into the notch. In other words, if pin 10' were inserted into gas-supply coupler 74 slightly more or slightly less than the normal position, rotatable cylinder 124 would still mate with annular notch 26'.

When apparatus 70 is assembled, a first passage through apparatus 70 is defined by threaded bore 114 in gas-supply coupler 74, longitudinal bore 16' in pin 10', elongated cavity 94 in boom arm 78, interior of hose 80, and pathway 104 through gas-directing block 84. When compressed gas is supplied from gas supply line 120 and forced through the first passage, the compressed gas is forced through main canal 108 in the direction of the arrows shown in FIG. 6, and air is drawn into main canal 108 from concave opening 96 through hole 110 thereby creating vacuum in concave opening 96. When vacuum is created in concave opening 96, vacuum cup 86 may then serve to lift an object placed under lifting surface 98.

A second passage is defined in assembled apparatus 70 by threaded bore 114' in gas-supply coupler 74, longitudinal bore 46' in pin 40', elongated cavity 94' in boom arm 78, interior of hose 82, and pathway 106 through gas-directing block 84. When compressed gas is supplied from gas supply line 120' and forced through the second passage, the gas is forced through pathway 106 in gas-directing block 84 in the direction of the arrows and the compressed gas enters concave opening 96 of vacuum cup 86, thereby releasing the vacuum and releasing any object that had been lifted by vacuum.

The notched and unnotched pins of the present invention may be reversed in the apparatus such that the longitudinal bore of the unnotched pin is part of the passage which is used for lifting the objects by suction and the longitudinal bore of the notched pin is part of the passage which is used for releasing the objects. In addition, two notched pins and two corresponding locking mechanisms may be employed in the apparatus of the invention, if desired.

Therefore, to use apparatus 70, vacuum cup 86 is placed over an object to be lifted. Compressed gas, such as compressed air, is then forced through the first passage, and the object is lifted by vacuum cup 86 by suction. The object may then be carried by vacuum cup 86 to the location desired. To release the object, compressed gas is shut off from the first passage and forced through the second passage, thereby blowing gas through vacuum cup 86 and releasing the object.

Except for the vacuum cup, elements of apparatus 70 may be formed of materials, such as metal or plastic. The vacuum cup and hoses are typically formed of flexible material, such as rubber.

Accordingly, the connector of the present invention is an improved connector for use with a pneumatic lifting apparatus having a locking mechanism for locking the connector in place. The connector may advantageously be fully-formed before assembly with the lifting apparatus and is easily aligned with the locking mechanism. In addition, the present invention provides an apparatus for lifting objects which uses the improved connector.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus for lifting objects by suction and releasing them by gas pressure, the apparatus comprising:

a lifting device having a gas-attachment end and a lifting end;

first and second pins each having a longitudinal bore extending therethrough and being attachable to the gas-attachment end of the lifting device, the first and second pins each having an extending portion which extends beyond the gas-attachment end when the pins are attached thereto, the first pin having an exterior annular notch on the extending portion; and a gas-supply coupler for connecting a gas supply to the lifting device, the gas-supply coupler being connectable to the first and second pins and having locking means which releasably locks into the annular notch on the first pin, the lifting device, the first and second pins, and the gas-supply coupler together having first and second passages leading from the gas-supply coupler, through the longitudinal bores of the first and second pins, respectively, and to the lifting end, the first passage being designed such that, when gas flows therethrough toward the lifting end, suction is created at the lifting end, and the second passage being designed such that, when gas flows therethrough toward the lifting end, gas is expelled at the lifting end.

2. The apparatus of claim 1, wherein the first pin has a first end, a second end, and a screw-threaded region near the second end.

3. The apparatus of claim 1, wherein the first pin has a first end and a second end and the longitudinal bore at the first end of the first pin is hexagonal.

4. The apparatus of claim 1, wherein the first pin has a first end, a second end, a non-threaded exterior region near the first end, a screw-threaded region near the second end, and a shoulder between the annular notch and the second end, and the screw-threaded region has a smaller diameter than the outer diameter of the shoulder.

5. The apparatus of claim 1, wherein the first pin has a first end, a second end, a non-threaded exterior region near the first end, a screw-threaded region near the second end, a shoulder between the annular notch and the screw-threaded region, and a smooth exterior region between the shoulder and the screw-threaded region, wherein the smooth exterior region and the screw-threaded region have smaller diameters than the outer diameter of the shoulder.

6. The apparatus of claim 1, wherein the first and second pins each have a first end and a second end, and the pins have in longitudinal sequence from the first end, a shoulder, a smooth exterior region, and a screw-threaded region, the portion from the shoulder to the first end being the extending portion, the screw-threaded region and the smooth exterior region having a smaller diameter than the outer diameter of the shoulder.

7. An apparatus for lifting objects by suction and releasing them by gas pressure, the apparatus comprising:

a lifting device having a gas-attachment end and a lifting end, first and second pins each having a longitudinal bore extending therethrough and being attachable to the gas-attachment end of the lifting device, the first and second pins each having an extending portion which extends beyond the gas-attachment end when the pins are attached thereto, the first pin having a first end, a second end, a screw-threaded region near the second end, and an exterior annular notch on the extending portion; and a gas-supply coupler for connecting a gas supply to the lifting device, the gas-supply coupler being connectable to the first and second pins and having locking means which releasably locks into the annular notch on the first pin, the lifting device, the first and second pins, and the gas-supply coupler together having first and second passages leading from the gas-supply coupler, through the longitudinal bores of the first and second pins, respectively, and to the lifting end of the lifting device, the first passage being designed such that, when gas flows therethrough, suction is created at the lifting end, and the second passage being designed such that, when gas flows therethrough, gas is expelled at the lifting end.

8. The apparatus of claim 7, wherein the first pin has a non-threaded exterior region near the first end and a shoulder between the annular notch and the second end, and the screw-threaded region has a smaller diameter than the outer diameter of the shoulder.

9. The apparatus of claim 7, wherein the first pin has a non-threaded exterior region near the first end, a shoulder between the annular notch and the screw-threaded region, and a smooth exterior region between the shoulder and the screw-threaded region, wherein the smooth exterior region and the screw-threaded region have smaller diameters than the outer diameter of the shoulder.

10. The apparatus of claim 7, wherein the second pin has a first end and a second end, and the first and second pins have, in longitudinal sequence from the first end, a shoulder, a smooth exterior region, and a screw-threaded region, the portion from the shoulder to the first end being the extending portion, the screw-threaded region and the smooth exterior region having a smaller diameter than the outer diameter of the shoulder.

11. An apparatus for lifting objects by suction and releasing them by gas pressure, the apparatus comprising:

a lifting device having a gas-attachment end and a lifting end;

first and second pins each having a longitudinal bore extending therethrough and being attachable to the gas-attachment end of the lifting device, the first and second pins each having an extending portion which extends beyond the gas-attachment end when the pins are attached thereto, the first pin having a first end and a second end and, in longitudinal sequence from the first end, a non-threaded exterior region, an exterior annular notch, a shoulder, a smooth exterior region, and a screw-threaded region, the screw-threaded region and the smooth exterior region having smaller diameters than the outer diameter of the shoulder; and a gas-supply coupler for connecting a gas supply to the lifting device, the gas-supply coupler being connectable to the first and second pins and having locking means which releasably locks into the annular notch on the first pin, the lifting device, the first and second pins, and the gas-supply coupler together having first and second passages leading from the gas-supply coupler, through the longitudinal bores of the first and second pins, respectively, and to the lifting end, the first passage being designed such that, when gas flows therethrough, suction is created at the lifting end, and the second passage being designed such that, when gas flows therethrough, gas is expelled at the lifting end.

12. An apparatus for lifting objects by suction and releasing them by gas pressure, the apparatus comprising:

a lifting device having a gas-attachment end and a lifting end;

first and second pins each having a longitudinal bore extending therethrough and being attachable to the gas-attachment end of the lifting device, the first and second pins each having an extending portion which extends beyond the gas-attachment end when the pins are attached thereto, the second pin having an exterior annular notch on the extending portion; and a gas-supply coupler for connecting a gas supply to the lifting device, the gas-supply coupler being connectable to the first and second pins and having locking means which releasably locks into the annular notch on the second pin, the lifting device, the first and second pins, and the gas-supply coupler together having first and second passages leading from the gas-supply coupler, through the longitudinal bores of the first and second pins, respectively, and to the lifting end, the first passage being designed such that, when gas flows therethrough toward the lifting end, suction is created at the lifting end, and the second passage being designed such that, when gas flows therethrough toward the lifting end, gas is expelled at the lifting end.

* * * * *